US009729696B2

(12) United States Patent
Shaju

(10) Patent No.: US 9,729,696 B2
(45) Date of Patent: Aug. 8, 2017

(54) METHOD AND SYSTEM FOR TRACKING MOBILE COMMUNICATION DEVICE USING MMS

(75) Inventor: Chakkalamattam Johnny Shaju, Karnataka (IN)

(73) Assignee: Samsung Electronics Co., Ltd (KR)

( * ) Notice: Subject to any disclaimer, the term of this patent is extended or adjusted under 35 U.S.C. 154(b) by 1578 days.

(21) Appl. No.: 11/903,097

(22) Filed: Sep. 20, 2007

(65) Prior Publication Data

US 2008/0076459 A1  Mar. 27, 2008

(30) Foreign Application Priority Data

Sep. 20, 2006 (IN) ............................ 1730/CHE/2006
May 28, 2007 (KR) ........................ 10-2007-0051733

(51) Int. Cl.
H04M 1/725 (2006.01)
H04W 12/12 (2009.01)

(52) U.S. Cl.
CPC ....... H04M 1/72555 (2013.01); H04W 12/12 (2013.01); H04M 2250/52 (2013.01)

(58) Field of Classification Search
CPC ... H04L 51/04; H04L 12/581; H04L 65/1016; H04L 65/1069; H04L 65/1006; H04L 29/06; H04W 64/00
(Continued)

(56) References Cited

U.S. PATENT DOCUMENTS

2005/0038595 A1* 2/2005 Yokota et al. ............... 701/200
2005/0169209 A1* 8/2005 Miu et al. .................... 370/328
(Continued)

FOREIGN PATENT DOCUMENTS

CN 0269657 A * 9/2002 ............... H04Q 7/35
DE 103 15 331 8/2003
(Continued)

OTHER PUBLICATIONS

3rd Generation Partnership Project; Technical Specification Group Services and System Aspects; General Packet Radio Service (GPRS); Service Description; Stage 2 (Release 1999), 3GPP TS 23.060 V3.16.0, Dec. 2003.

(Continued)

*Primary Examiner* — George Eng
*Assistant Examiner* — Jing Gao
(74) *Attorney, Agent, or Firm* — The Farrell Law Firm, P.C.

(57) ABSTRACT

A system and method for tracking a mobile electronic device, which is capable of accesses a wireless or wired network, using a Multimedia Messaging Service (MMS). The mobile device includes a storing function for storing one or more contact phone numbers or Email addresses. When the mobile communication device is lost or stolen and Subscriber Identity Module (SIM) card of the mobile terminal is changed, the mobile device verifies whether the SIM card is the same as that of the owner of the mobile device by comparing the International Mobile Subscriber Identity (IMSI) numbers of the two SIM cards. If the IMSI numbers are different, the mobile device activates a tracking feature. The tracking feature stealthily captures still images or motion pictures of the surrounding area and transfers those captured images/videos to a pre-stored contact phone numbers through a MMS or through a pre-stored Email address.

18 Claims, 6 Drawing Sheets

(58) Field of Classification Search
USPC ............... 455/466, 410, 414.2, 412.2; 348/14.01–14.16
See application file for complete search history.

(56) References Cited

U.S. PATENT DOCUMENTS

| | | |
|---|---|---|
| 2006/0025177 A1 | 2/2006 | Tu |
| 2006/0069687 A1* | 3/2006 | Cui et al. .................... 707/10 |
| 2006/0276175 A1 | 12/2006 | Chandran |
| 2007/0082705 A1 | 4/2007 | Jain et al. |
| 2009/0005012 A1* | 1/2009 | van Heugten ...... H04M 1/7255 455/413 |

FOREIGN PATENT DOCUMENTS

| | | | | |
|---|---|---|---|---|
| IN | 1307/CHE/2004 | * | 1/2006 | |
| JP | 2004-112126 | | 4/2004 | |
| JP | 2004-112126 | * | 8/2004 | ............... H04Q 7/38 |
| KR | 2006-0063710 | * | 6/2006 | ............... H04B 1/40 |
| WO | WO 2004/089021 A2 | * | 10/2004 | |
| WO | WO 2004089021 A2 | * | 10/2004 | |
| WO | WO 2005/081555 | * | 9/2005 | |

OTHER PUBLICATIONS

3rd Generation Partnership Project; Technical Specification Group Terminals; Technical Realization of the Short Message Service (SMS) (Release 1999), 3GPP TS 23.040 V3.10.0, Jun. 2003.

3rd Generation Partnership Project; Technical Specification Group Services and System Aspects; Personalisation of Mobile Equipment (ME); Mobile Functionality Specification (Release 1999), 3GPP TS 22.022 V3.2.1, Jun. 2002.

3rd Generation Partnership Project; Technical Specification Group Services and System Aspects Service Aspects; Stage 1 Multimedia Messaging Service (3G TS 22.140 Version 3.0.0), 3G TS 22.140 3.0.0, Dec. 1999.

3rd Generation Partnership Project; Technical Specification Group Terminals; Multimedia Messaging Service (MMS); Functional Description; Stage 2 3G TS 23.140 Version 2.0.0) 3G TS 23.140 V2.0.0, Mar. 2000.

* cited by examiner

METHOD AND SYSTEM FOR TRACKING MOBILE COMMUNICATION DEVICE USING MMS

PRIORITY

This application claim priority under 35 U.S.C. §119(a) to a Korean Patent Application filed in the Korean Intellectual Property Office on May 28, 2007 and assigned Serial No. 2007-51733, and to an Indian Patent Application filed in the Indian Intellectual Property Office on Sep. 20, 2006 and assigned Serial No. 1730/CHE/2006, the contents of which are incorporated herein by reference.

BACKGROUND OF THE INVENTION

1. Field of the Invention

The present invention relates, in general, to mobile communication devices, and in particular, to a device and method for tracking a mobile communication device using a Multimedia Messaging Service (MMS).

2. Description of the Related Art

Mobile communications technology is fast becoming a positive force in social and economic development. As such, mobile communication device security technology is now a significant factor in hastening this development. Currently, mobile phone security measures involving mobile phone tracking have become standard in the mobile communications industry.

The existing method of tracking a mobile phone involves first detecting for possible misuse (e.g., when the phone is stolen and the Subscriber Identity Module/Universal Subscriber Identity Module (SIM/USIM) is replaced) and then reporting this event, through the mobile phone itself, to the actual owner through a Short Message Service (SMS), Multimedia Messaging Service (MMS) or Email, without the need for network queries:

In FIG. 1, there is shown a conventional identity check process which is typically used in tracking a lost or misplaced mobile phone. In step 50, a Serving GPRS Support Node (SGSN) or a Mobile Switching Center (MSC) 30 sends an Identity Request (Identity Type) to the Mobile Station (MS) 10 and in response the MS 10 sends an Identity Response (Mobile Identity) in step 52. If the SGSN or MSC decides to check the International Mobile Equipment Identity (IMEI) against the Equipment Identity Register (EIR) 40, the SGSN or MSC sends a Check IMEI to the EIR 40 in step 54. The EIR 40 responds with a Check IMEI Ack in step 56.

There are, in the prior art, systems and methods of tracking stolen mobile devices. In U.S. Publication No. 2006/0276175 A1, assigned to the assignee of the present application and entitled "A Method Of Tracking Stolen Mobile Device," there is disclosed a method for tracking electronic devices which use a removable user identity card. The method includes providing a menu option for inputting a password, destination Email-id/phone number and a customized message content for sending an alert SMS/Email message when the user activates the tracking control operation in the electronic device; inputting a password, destination Email-id/phone number and a customized message contents for sending the alert SMS/Email message; storing the user-authentication information for accessing the alert-SMS/Email message feature, the destination Email address/phone number, and any predefined text to be sent in Non-Volatile Random Access Memory (NVRAM); comparing the International Mobile Subscriber Identity (IMSI) stored in the NVRAM with the new IMSI whenever a new user identity card is inserted once the tracking control feature is successfully activated; and sending an alert-SMS/email to the predefined destination if there is a mismatch between the IMSI stored in the NVRAM and the new IMSI along with the current location information of the device if available. However this method does not provide means for sending device information through a Multimedia Messaging Service (MMS).

In Japanese Publication No. 2004-112126, entitled, "Mobile Phone", a method of mobile tracking wherein the possessor of the mobile phone transmits electronic mail including a command character string set in advance to the mobile phone is described. Here, the mobile phone shifts into a tracing mode, and automatically transmits positional information of a present registration base station and a photographed image by an attached camera under an ordinary waiting display to a preset electronic mail address. Thereafter, the mobile phone periodically and automatically transmits the information above and history information such as calls from the mobile phone by each time by the setting of a mobile phone built-in timer. Further, the mobile phone replaces personal information data in a telephone directory with fictional data and displays the fictional data. Moreover, the mobile phone interrupts its speech after a prescribed time.

Another patent entitled, "Mobile Telephone With Camera Has Anti-Theft-And Personal Security System Which Takes And Transmits Pictures Rapidly To Telephone Number Stored In Memory," describes a mobile telephone having a camera that is either integrated or stuck on the housing. The mobile phone features a snapshot function and a high-speed transfer function for transferring the captured picture, the series of pictures or the video sequence to a node within a domain or network, e.g., a home PC or the Internet. The publication suggests the use of Session Initiation Protocol (SIP) for initiating, modifying and ending sessions between nodes and the use of Mobile Internet Protocol (IP) when there is an increase in the mobility rate of the various nodes. However, this publication suggests that the mobile telephone is used mainly for crime prevention purposes and fails to utilize the technique of International Mobile Subscriber Identity (IMSI) number comparison of the SIM card. For example, the mobile telephone can automatically activate the tracking function when a person carrying the device is being confronted by a criminal via pressure sensitive keys/areas on the device.

SUMMARY OF THE INVENTION

An aspect of the present invention is to substantially solve at least the above problems and/or disadvantages and to provide at least the advantages below. Accordingly, one aspect of the present invention provides a method and system for tracking a lost or a stolen mobile device through a Multimedia Messaging Service (MMS). The mobile phone device includes a storing function for storing one or more contact numbers or Email addresses. When the mobile device is lost or stolen, and the SIM card is changed, the mobile device verifies whether the SIM card is the same as that of the owner by matching each of the IMSI numbers. If the IMSI numbers are different, then the mobile device activates a tracking feature. The tracking feature stealthily captures still images or video snapshots of the surrounding area and transfers those captured images/videos to the pre-stored contact numbers through the Multimedia Message Service (MMS) or sends the images/videos to the any one of the pre-stored Email addresses.

Another aspect of the present invention is to invent a new method for tracking any mobile phone device using Multimedia Message Service (MMS) without the network initiating any added queries.

Yet another aspect of the present invention is to track stolen mobile phones or laptops or any mobile communication device which supports network connectivity, by automatically sending a SMS/MMS/Email message to a preset destination, if the tracking feature in the mobile device is turned on, whenever the SIM/USIM card is changed or powered up with a SIM/USIM card that is different from that of the original user who activated tracking feature, or whenever the mobile phone/laptop/mobile device is connected to a network after power-up.

Still another aspect of the present invention is to provide a method for tracking a communication device without any extra efforts from the user/operator.

Yet another aspect of the proposed invention is to provide a mobile communication device tracking method which does not depend on the presence of an Equipment Identity Register (EIR) in the network, providing quick and efficient tracking, as compared to network querying the International Mobile Equipment Identity (IMEI) of all the users.

According to one aspect of the present invention, there is provided a method by which a mobile device or an electronic device stealthily initiates a camera application and captures pictures or records a short video clip and thereafter sends these pictures and video clips to a predetermined number stored in the device by user using a Multimedia Message Service (MMS) or Email.

The method for tracking electronic communication devices which use removable identity cards includes providing a menu option for inputting a password, destination Email-ID/phone and a customized message for sending a Multimedia Message Service (MMS) when the user activates the tracking control operation; inputting a password, destination Email address/phone number and a customized message contents for sending the alert Multimedia Message Service (MMS) message; storing the user-authentication information for accessing the alert MMS feature, the destination Email address/phone number, and any predefined text to be sent in Non-Volatile Random Access Memory (NVRAM), along with the identity data and Tracking Control feature-activation status data; comparing the identity data stored in the NVRAM with the new identity data whenever a new identity card is inserted once the tracking control feature is successfully activated; capturing still images or video if there is a mismatch between the identity data stored in the NVRAM and the new identity data; and transferring the captured images/videos along with the pre-stored contact phone numbers through the MMS or sending the images/videos to the pre-stored Email addresses along with the current location information of the mobile device if the location information is available.

According to another aspect of the present invention, there is provided a system for tracking electronic communication devices that uses removable identity cards. The system includes means for inputting a password, destination Email address/phone number and a customized message for sending an alert Multimedia Messaging Service (MMS) message when the user activates a tracking control feature; a memory for storing the user-authentication information for accessing the MMS message, the destination Email address/phone number, and any predefined text to be sent, along with the identity data and Tracking Control feature-activation status data; means for comparing the identity data stored in the Non-Volatile Random Access Memory (NVRAM) with the new identity data whenever a new identity card is inserted once the tracking control feature is successfully activated; means for capturing still images or video if the identity data stored in the NVRAM and the new identity data are different; and means for transferring the captured image/video data to the pre-stored contact phone numbers through the Multimedia Messaging Service (MMS) or sending the image/video data to the pre-stored Email addresses along with the current location information of the device if the location information is available.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

The preferred embodiments of the present invention will now be explained with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

In one embodiment, the present invention provides a method for tracking the Mobile Equipment (ME) by initiating the ME to detect possible misuse (i.e., when the phone is stolen and Subscriber Identity Module/User Services Identity Module (SIM/USIM) replaced, or if the device is not a phone, when the device accesses a network), and reporting the misuse to the actual mobile device owner, without the network initiating any queries.

Figure 1:
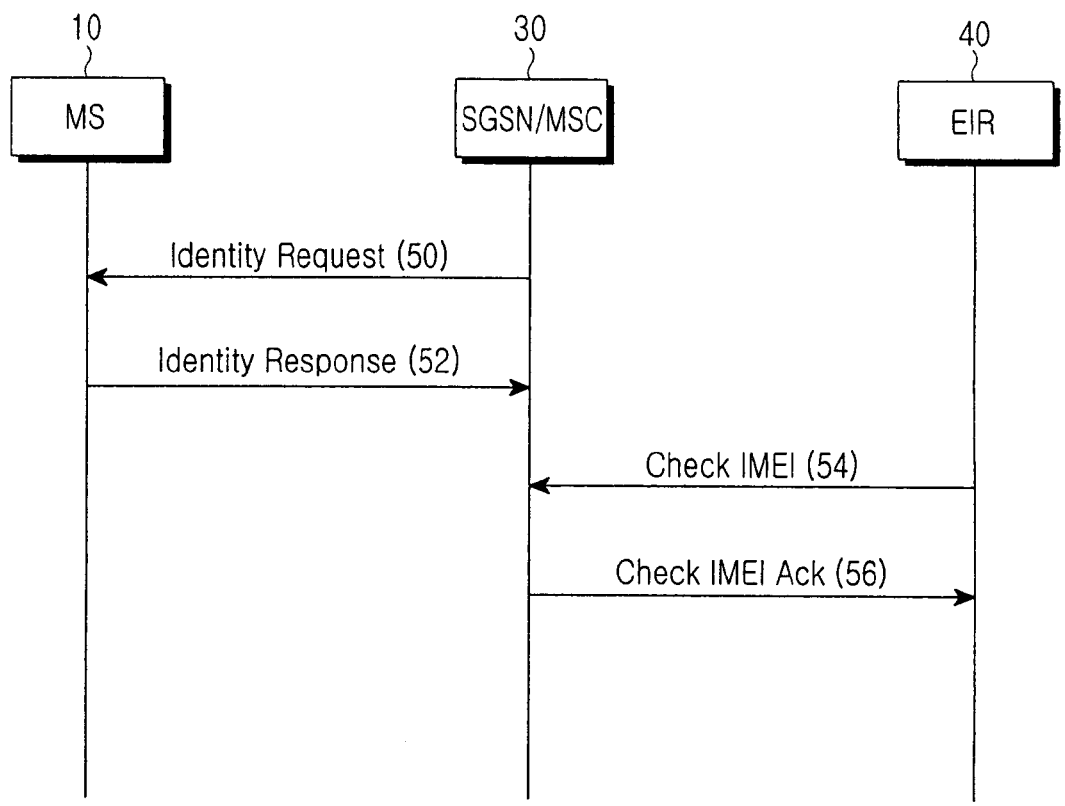
FIG. 1 illustrates a mobile network Identity Check procedure according to the present invention.
Figure 2:
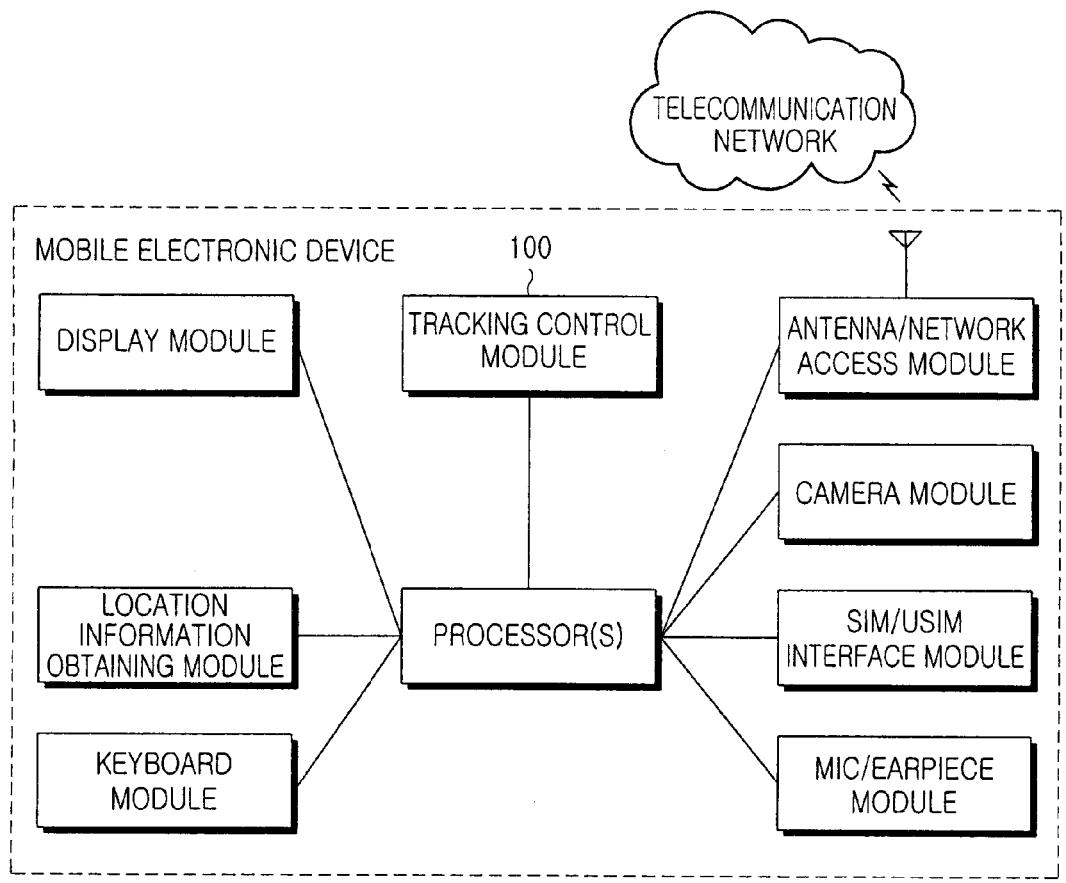
FIG. 2 is a block diagram of a mobile communication device according to the present invention.

FIG. 2 illustrates a block diagram of a mobile electronic device according to the present invention used within a telecommunications network. In FIG. 2, the mobile electronic device includes a Tracking Control module 100, which described below with respect to FIG. 3.

In operation, whenever the SIM/USIM card is changed or powered up with a different SIM/USIM card, the mobile device automatically send an alert-SMS/MMS/Email to a preset destination. The mobile device also initiates the camera application, stealthily, (e.g., without showing a preview screen on the device display and then captures a few pictures or records a short video clip which is configurable, depending on available memory. These pictures or video clips will then be sent to a preset destination stored in the device by the Original user using a Multimedia Message Service (MMS) or Email.

Furthermore, the mobile device provides the user with a menu option having password protection or a Tracking Control Key (TCK). In this case, the menu option choices allow the user to turn on/off password protection feature, to edit the destination Email-address/phone number, or to edit the user-defined part of the message content for sending the alert SMS/MMS/Email. When the user tries to activate the tracking feature, the user is prompted for the Tracking Control Key. To access/change the alert-message destination and the customizable contents, the user has to input the Tracking Control Key.

If the user wishes to access/change a password, a destination Email-ID/phone number, or a customized message content for sending the SMS/MMS/Email message, the configured password has to be input by the user. In the SMS/MMS/Email message, the location information and Mobile Station Integrated Services Digital Network/International Mobile Subscriber Identity (MSISDN/IMSI) of the current user is included in addition to customized message. The user-authentication information stored in the NVRAM is the IMSI of the current SIM/USIM card for a mobile phone supporting the SIM/USIM card. If there is no SIM/USIM card, the user is prompted to insert the SIM/USIM card. If the initial attempt to send an SMS/email fails, the mobile device keeps trying periodically or with increased delay after each attempt, until successful, where the number of permitted attempts is preset in the mobile device. If the SIM/USIM card of the new user has 'Outgoing Calls Barred' option already set, when the card is inserted the mobile device sends an alert SMS/MMS/email when call barring is removed.

Figure 3:
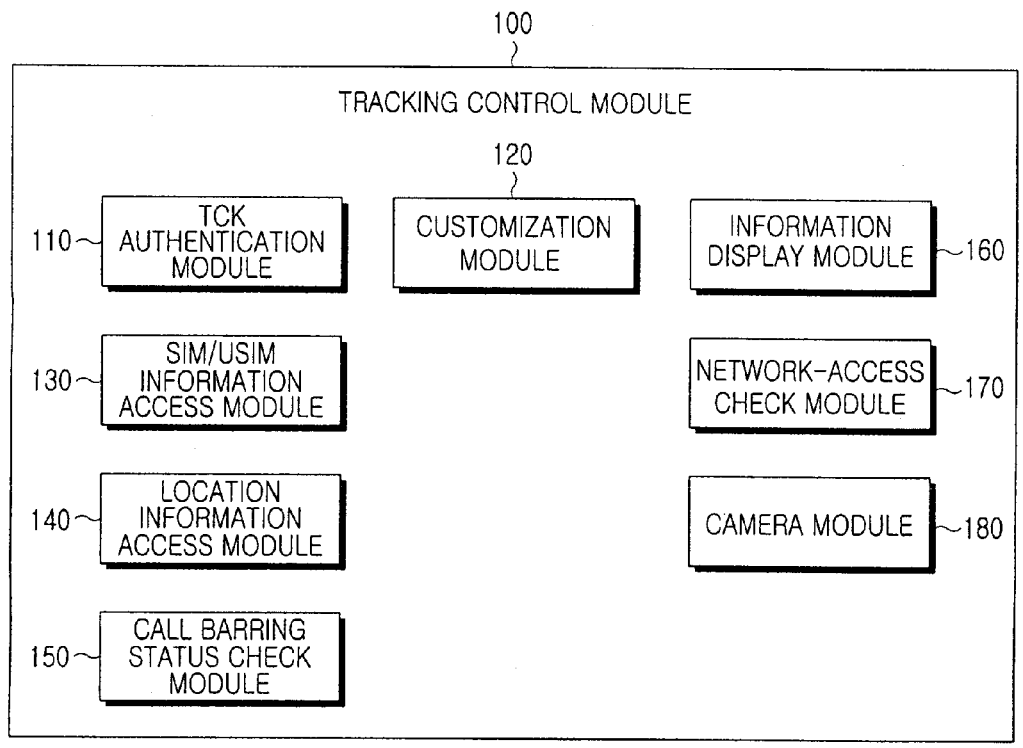
FIG. 3 is a block diagram of the Tracking Control Module of the device shown in FIG. 2 according to the present invention.

FIG. 3 illustrates a block diagram of the Tracking Control Module of the mobile electronic device according to the present invention.

In FIG. 3, there is shown a Tracking Control Module, including a TCK Authentication module 110, a Customization module 120, a Subscriber Identity Module/Universal Subscriber Identity Module (SIM/USIM) Info Access module 130, a Location Information Access module 140, a Call Barring Status Check module 150, an Info Display module 160, a Network-Access Check module 170, and a Camera module 180.

The TCK authentication module 110 handles activation/deactivation of Tracking Control and for accessing the customization of the information to be sent in the message.

The Customization module 120 maintains the message format and content information. The SIM/USIM Information Access module 130 receives the required information (e.g., the IMSI, the Call Barring Status, etc.) from the SIM/USIM and detects a change of SIM/USIM card.

The Location Info Access module 140 receives the information concerning the current location information of the device, if the user has opted for it to be sent in an alert message.

The Call Barring Status Check module 150, if an outgoing call is barred, periodically checks if the status has changed and sends the alert message.

The Information Display module 160 displays the current settings.

The Network Access Check module 170 detects if a mobile device does not use a SIM card and thus triggers the alert SMS/MMS when the mobile device is connected to a network.

The Camera module 180 stealthily takes pictures or video clips whenever a new SIM/USIM Card is detected. These pictures and video are included as part of the MMS or Email which is sent to a pre-defined destination as determined by the mobile device user.

In another embodiment, the Tracking Control module 100 includes an Instant Messaging module, which has instant messaging applications.

Figure 4:
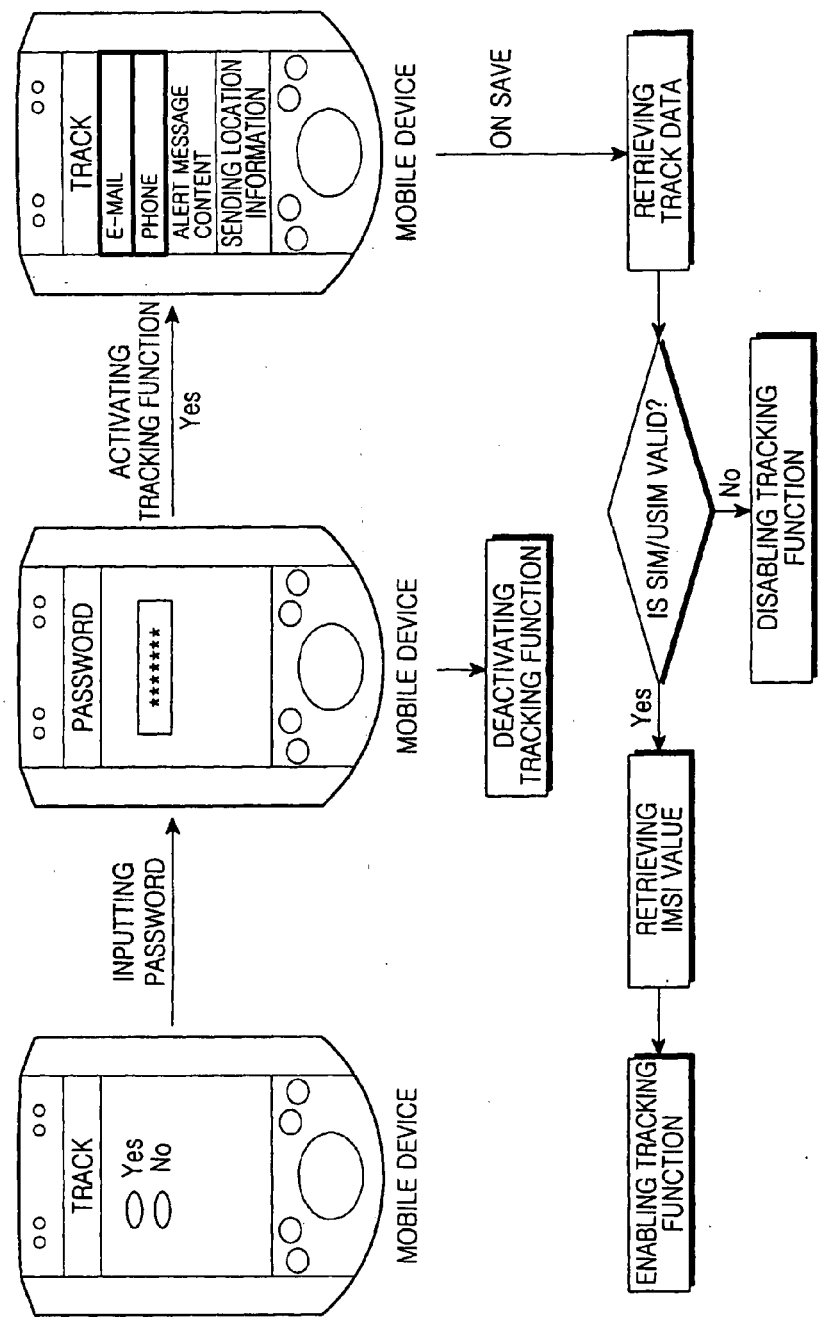
FIG. 4 illustrates a process of activating the Tracking Control feature in the mobile devices according to the present invention.

FIG. 4 illustrates a process of activating the Tracking Control feature of the Tracking Control module of the mobile device according to the present invention.

When the user tries to activate the feature, the user is prompted for a password (i.e., the Tracking Control Key (TCK)). Thereafter, the user is prompted for the alert-message destination and optionally the customizable contents of the alert message. The Tracking Control module is then activated. If the user then chooses to access/change any of these features, the TCK has to be input by the user. In the alert-SMS/MMS/email-message, the Location Information, Mobile Station Integrated Services Digital Network/International Mobile Subscriber Identity (MSISDN/IMSI), etc. of the current mobile device user can be included, in addition to any user-defined text information.

The mobile device then initiates the camera application (without activating the display preview setting on the display module), and through the camera module takes a few pictures or records a short video clip of the immediate surroundings. Advantageously, with a non-activated display preview, the non-authorized users of the mobile device will be unaware that their actions are being recorded.

Furthermore, these recordings may be stored in memory unit of the mobile device. Also, these recorded pictures or video clips will then be sent to a preset destination stored in the mobile device by the original owner using the MMS feature. These picture and video recordings can also be sent if the SIM is supporting General Packet Radio Service (GPRS) or Third Generation (3G) services, even by Email.

In addition, with the user-authentication information which accesses the SMS/MMS/Email message, the destination Email address/phone number, or any other pre-defined text to be sent will be stored in Non-Volatile Random Access Memory (NVRAM) of the mobile device.

In the present invention, when the Tracking Control feature is activated as for a mobile device supporting a SIM/USIM card, the IMSI of the current SIM/USIM card is stored in the NVRAM, or if there is no SIM/USIM card, the user is prompted to insert SIM/USIM card. Once the Tracking Control feature is successfully activated as above, whenever a new SIM card is inserted, the device will compare the IMSI stored in the NVRAM with the new IMSI and if there is a mismatch, will send an SMS/MMS/Email to the destination that was specified by the owner. The current Location Information of the mobile device (based on the Location Identity) as obtained from the radio access technology (e.g., Global System for Mobile communications/Universal Mobile Telecommunications System/Code Division Multiple Access (GSM/UMTS/CDMA)), will also be included in the message.

If the initial attempt to send the SMS/MMS/Email message fails, the device keeps trying periodically until successful. Here, the number of times the mobile device tries to send the SMS/MMS/Email message can be configured by the user through the mobile device. However, if the SIM/

USIM card of the new user has an 'Outgoing Calls Barred' option already set, when the SIM/USIM is inserted, the device can be programmed to remember that the SIM/USIM card was changed and can, subsequently, send the SMS/MMS message later when the call barring function is removed.

Figure 5A:
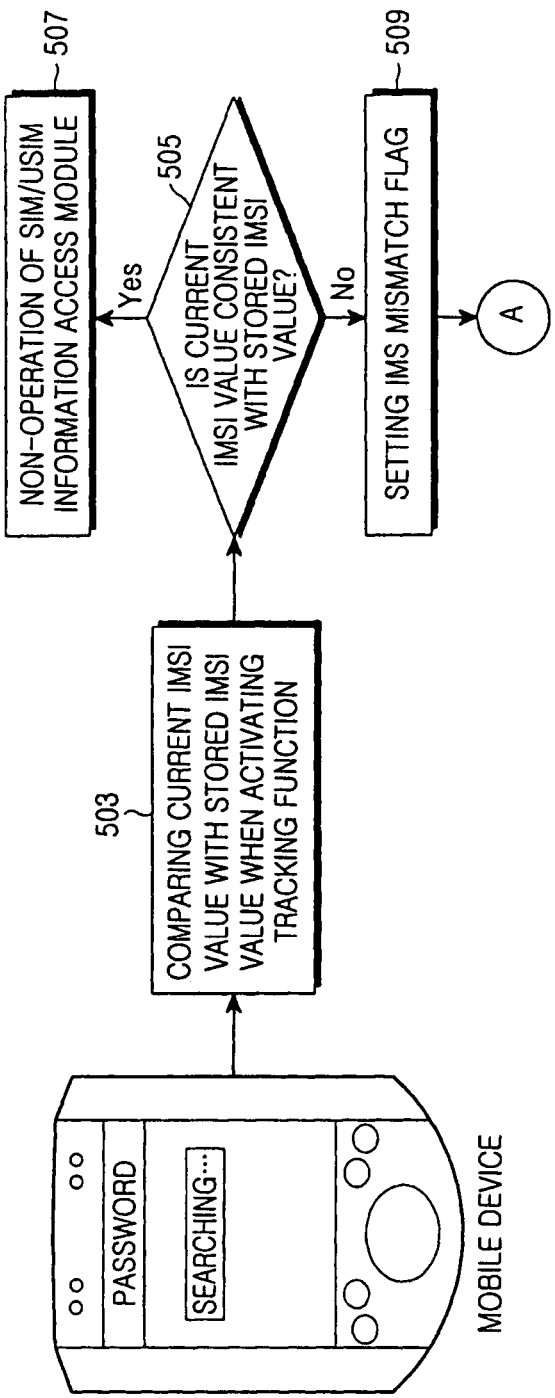
FIG. 5 illustrates sequence of events between various functions, when the tracking feature is activated according to the present invention.
Figure 5B:
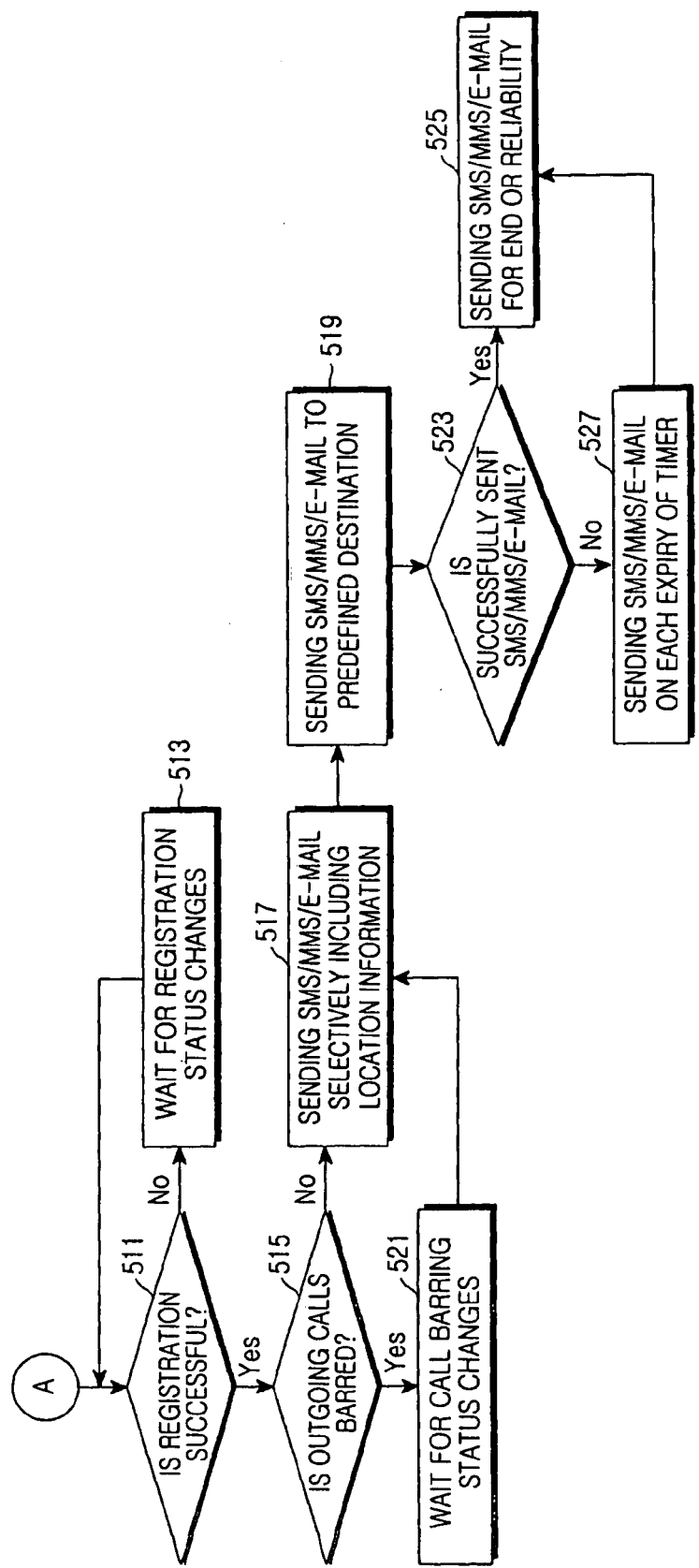

FIG. 5 illustrates a sequence of events between various functions when the tracking feature of the mobile device is activated according to the present invention.

When the device is powered on in step 501 the SIM/USIM Information Access module 130 is initialized and receives the required information from the SIM/USIM, like, for example, IMSI data and call, barring status etc, and detects the change of SIM/USIM card.

If the tracking feature is enabled, the current IMSI value is retrieved from the SIM and compared with the NVRAM information in step 505 wherein the user-authentication information for accessing the SMS/MMS/Email message feature, the destination Email address/phone number, and any predefined text to be sent are stored.

If the IMSI from the SIM is the same as that stored in the NVRAM, the SIM/USIM Information Access module 130 takes no action in step 507. Otherwise, the IMSI mismatch flag is set in step 509.

If the mismatch flag is set, the system then checks whether the registration has been successful or not in step 515. If it is not successful the system waits until the registration status changes in step 521.

If the registration is successful the system checks whether the outgoing calls are barred. If the outgoing call is barred then the system waits until the call barring status changes. On change of call barring status, the system checks whether the tracking feature is enabled and the IMSI mismatch flag is set.

Moreover, if the user wanted to include location information, the Location Information Access module 140 is activated to obtain location information. The Camera module 180 is initiated without showing the preview display setting on the display, and takes on or more pictures or a video snapshot of the immediate surroundings. A SMS/MMS/Email message is then sent to a configured destination from the Tracking Control module 100 with all the relevant data in step 517.

If the user has specified both a phone number and an Email ID, then the SMS, MMS and Email are sent. Moreover, the SMS/MMS/Email are sent multiple times to increase reliability in step 519. Thereafter, the system then checks whether the secret SMS/MMS/E-mail has been send successfully in step 523.

If transmission of the SMS/MMS/Email is successful, the process ends, or the mobile device may continue sending the SMS/MMS/Email with an increased delay between each attempt to increase transmission reliability and to ensure that the mobile device owner receives any other related details in step 525.

However, if the message was not sent successfully, a staggered periodic timer is initialized. Upon expiration of the timer, the system tries to send an alert SMS/MMS/E-mail to the configured destination from Tracking Control module 100 with all the relevant data. If transmission is not successful, the system increases the timer duration in step 527 and restarts the timer and repeats the process.

It will also be obvious to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a microchip, microprocessor, handheld communication device, computer, rendering device or a multi function device.

Although the present invention has been fully described in connection with the preferred embodiments thereof with reference to the accompanying drawings, it is to be noted that various changes and modifications are possible and are apparent to those skilled in the art. Such changes and modifications are to be understood to be within the scope of the present invention as defined by the appended claims.

What is claimed is:

1. A method for tracking an electronic communication device which uses a removable identity card, the method comprising:
   storing, by the electronic communication device, a destination phone number and identity data in a memory of the electronic communication device;
   comparing, by the electronic communication device, the identity data stored in the memory with new identity data when a new identity card is inserted; and
   when determining that the identity data stored in the memory and the new identity data are different, transferring, to the destination phone number by the electronic communication device, a Short Message Service (SMS) message including current location information of the electronic communication device and information on the new identity card, executing, by the electronic communication device, a camera application without displaying a preview screen of the camera application, stealthily capturing, by the electronic communication device, a video using a camera of the electronic communication devices, and
   transferring to the destination phone number, by the electronic communication device, a Multimedia Messaging Service (MMS) message including the captured video,
   wherein the transferring of the SMS message, the stealthily capturing of the video and the transferring of the MMS message are automatically and sequentially performed by the electronic communication device in response to determining that the identity data stored in the memory and the new identity data are different from each other, and
   wherein the video records actions of a non-authorized user.

2. The method of claim 1, wherein the electronic communication device provides a menu option with a password protection option through a Tracking Control Key.

3. The method of claim 2, wherein the Tracking Control Key is used to turn the tracking feature on or off and for editing the destination phone number.

4. The method of claim 2, wherein the Tracking Control Key is used for editing a message content associated with the SMS message.

5. The method of claim 2, wherein when a user tries to activate a tracking feature, the user is prompted for the Tracking Control Key.

6. The method of claim 1, wherein stealthily capturing further comprises:
   determining whether available memory supports recording a short video clip;
   stealthily capturing the short video clip, when available memory supports recording the short video clip; and stealthily capturing still images when available memory does not support recording the short video clip.

7. The method of claim 1, wherein if the transferring of the SMS message and the transferring of the MMS message are not successful, a staggered periodic timer is initialized for retransmission of the SMS message and the MMS message, with an increased delay between each retransmission attempt.

8. An electronic communication device which uses a removable identity card, the electronic communication device comprising:

a memory configured for storing a destination phone number and identity data; and a processor configured for:

comparing the identity data stored in the memory with new identity data when a new identity card is inserted; and when determining that the identity data stored in the memory and the new identity data are different, transferring, to the destination phone number, a Short Message Service (SMS) message including current location information of the electronic communication device and information on the new identity card, executing a camera application without displaying a preview screen of the camera application, stealthily capturing a video using a camera of the electronic communication device, and transferring, to the destination phone number by the electronic communication device, a Multimedia Messaging Service (MMS) message including the captured video, wherein the transferring of the SMS message, the stealthily capturing of the video and the transferring of the MMS message are automatically and sequentially performed by the electronic communication device in response to determining that the identity data stored in the memory and the new identity data are different from each other, and wherein the video records actions of a non-authorized user.

9. The electronic communication device of claim 8, further including a Tracking Control Key authentication module which handles activation/deactivation of a tracking control feature and accessing of a customized message data to be sent in the SMS message.

10. The electronic communication device of claim 8, further including a customization module, for maintaining and customizing message format and content information of the SMS message.

11. The electronic communication device of claim 8, further including an Identification Info Access module, for receiving data from the identity card and detecting a change of the identity card.

12. The electronic communication device of claim 8, further including a Location Information Access module for receiving information concerning the current location information of the electronic communication device if a user chooses that the current location information be sent in the SMS message.

13. The electronic communication device of claim 8, further including a Call Barring Status Check module for periodically checking a status change for sending the SMS message when an outgoing call is barred.

14. The electronic communication device of claim 8, further includes an Information Display module for displaying current settings.

15. The electronic communication device of claim 8, further including a Network Access Check module for activating the SMS message for the electronic communication device without an identity data card and when the electronic communication device is connected to a network.

16. The electronic communication device of claim 8, further including an Instant Messaging module for generating an instant message via an Instant Messaging application.

17. The electronic communication device of claim 8, wherein the processor is configured for:

determining whether available memory supports recording a short video clip;

stealthily capturing the short video clip, when available memory supports recording the short video clip; and stealthily capturing still images when available memory does not support recording the short video clip.

18. The electronic communication device of claim 8, wherein if the transferring of the SMS message and the transferring of the MMS message are not successful, a staggered periodic timer is initialized for retransmission of the SMS message and the MMS message, with an increased delay between each retransmission attempt.

* * * * *

UNITED STATES PATENT AND TRADEMARK OFFICE
CERTIFICATE OF CORRECTION

PATENT NO. : 9,729,696 B2  
APPLICATION NO. : 11/903097  
DATED : August 8, 2017  
INVENTOR(S) : Chakkalamattam Johnny Shaju Page 1 of 1

It is certified that error appears in the above-identified patent and that said Letters Patent is hereby corrected as shown below:

In Claim 1, Line 21, "electronic communication devices, and" should be -- electronic communication device, and --

Signed and Sealed this
Nineteenth Day of June, 2018

Andrei Iancu
*Director of the United States Patent and Trademark Office*